(12) United States Patent
Ma et al.

(10) Patent No.: US 11,738,668 B2
(45) Date of Patent: Aug. 29, 2023

(54) INFANT CAR SEAT AND RELEASE ACTUATOR

(71) Applicant: Wonderland Switzerland AG, Steinhausen (CH)

(72) Inventors: Andrew Ma, Downingtown, PA (US); Kyle S. Mason, Lititz, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/726,264

(22) Filed: Apr. 21, 2022

(65) Prior Publication Data

US 2022/0242281 A1 Aug. 4, 2022

Related U.S. Application Data

(63) Continuation of application No. 17/023,405, filed on Sep. 17, 2020, now Pat. No. 11,345,262.

(Continued)

(51) Int. Cl.
*B60N 2/28* (2006.01)

(52) U.S. Cl.
CPC ............ *B60N 2/2821* (2013.01); *B60N 2/286* (2013.01); *B60N 2/289* (2013.01); *B60N 2/2824* (2013.01);
(Continued)

(58) Field of Classification Search
CPC .... B60N 2/2821; B60N 2/2824; B60N 2/289; B60N 2/2884; B60N 2/2893; B60N 2/286; B60N 2/2863; B60N 2/2848
See application file for complete search history.

(56) References Cited

U.S. PATENT DOCUMENTS 4,834,403 A * 5/1989 Yanus ..................... B62B 7/12
                                                   280/30
4,872,692 A * 10/1989 Steenburg ................. B62B 7/12
                                                   280/30
(Continued)

FOREIGN PATENT DOCUMENTS

AU       200235562 A1    10/2003
CN       202071722 U     12/2011
(Continued)

OTHER PUBLICATIONS

European Application No. 20196670.2-1012 filed Sep. 17, 2020; European Search Report dated Feb. 25, 2021; 7 pages.

(Continued)

*Primary Examiner* — Syed A Islam

(74) *Attorney, Agent, or Firm* — Cantor Colburn LLP

(57) ABSTRACT

An infant car seat includes a seat base and a stability leg. The stability leg is rotatably disposed under the seat base. The stability leg includes an upper leg tube, a rotary member and a first latch. The upper leg tube includes at least one opening. The rotary member includes a pivoting portion and an encircling portion. The pivoting portion is rotatably connected to the seat base. The encircling portion is connected to the pivoting portion and slidably disposed on the upper leg tube. The first latch is disposed on the rotary member, and adapted to detachably engage with the at least one opening for constraining a movement between the rotary member and the upper leg tube.

11 Claims, 20 Drawing Sheets

Related U.S. Application Data

(60) Provisional application No. 62/901,544, filed on Sep. 17, 2019.

(52) U.S. Cl.
CPC .......... *B60N 2/2848* (2013.01); *B60N 2/2863* (2013.01); *B60N 2/2893* (2013.01)

(56) References Cited

U.S. PATENT DOCUMENTS

| | | | |
|---|---|---|---|
| 5,385,387 A | 1/1995 | Kain | |
| 5,772,279 A * | 6/1998 | Johnson, Jr. | B60N 2/2848 297/440.16 |
| 6,209,957 B1 | 4/2001 | Baloga et al. | |
| 7,908,981 B2 | 3/2011 | Agee | |
| 8,226,164 B2 | 7/2012 | Chen | |
| 8,973,987 B2 | 3/2015 | Mo | |
| 10,737,594 B2 | 8/2020 | Bohm et al. | |
| 2007/0252067 A1 | 11/2007 | Lee | |
| 2008/0030052 A1 | 2/2008 | Chen et al. | |
| 2008/0303321 A1 | 12/2008 | Powell | |
| 2019/0359092 A1 | 11/2019 | Harmes, V et al. | |
| 2021/0316642 A1 | 10/2021 | Ma et al. | |

FOREIGN PATENT DOCUMENTS

| | | |
|---|---|---|
| CN | 102729855 A | 10/2012 |
| CN | 203237080 U | 10/2013 |
| CN | 104223847 A | 12/2014 |
| CN | 109398174 A | 3/2019 |
| CN | 110395152 A | 10/2019 |
| DE | 202013103194 U1 | 10/2013 |
| EP | 1927502 A1 | 6/2008 |
| EP | 1930205 A2 | 6/2008 |
| EP | 2623368 A1 | 8/2013 |
| GB | 2490024 A | 10/2012 |
| GB | 2530375 A | 3/2016 |
| JP | 2016007933 A | 1/2016 |

OTHER PUBLICATIONS

European Application No. 20196674.4-1012 filed Sep. 17, 2020; European Search Report dated Mar. 18, 2021; 24 pages.

U.S. Appl. No. 17/023,405, filed Sep. 17, 2020; Non-Final Office Action dated Oct. 8, 2021; 21 pages.

U.S. Appl. No. 17/023,413, filed Sep. 17, 2020; Non-Final Office Action dated Oct. 25, 2021; 16 pages.

Chinese First Office Action; Chinese Application No. 202010979091.3; dated Jul. 5, 2022; 13 pages.

Chinese Office Action with english translation for Chinese Application No. 202010982314.1; dated Dec. 5, 2022 (pp. 1-31).

Extended European Search Report for European Application No. 22202114.9; dated Mar. 6, 2023 (pp. 1-5).

* cited by examiner

INFANT CAR SEAT AND RELEASE ACTUATOR

CROSS REFERENCE TO RELATED APPLICATIONS

This application is a continuation of U.S. patent application Ser. No. 17/023,405, filed Sep. 17, 2020, which claims the benefit of U.S. Provisional Patent Application No. 62/901,544, filed Sep. 17, 2019, both of which are incorporated by reference in their entirety herein.

BACKGROUND OF THE INVENTION

Field of the Invention

The present invention relates to an infant car seat and a release actuator, and more particularly, to an infant car seat and a release actuator with an adjustable and easy-to-operation function.

Description of the Prior Art

An infant car seat is used to transport and protect infants in the vehicle. When the infant car seat is installed in the vehicle, a car seat base is secured to the vehicle via a latch belt or a vehicle belt, and the car seat base ensures the infant car seat is stably installed in the vehicle. The infant car seat further disposes a stability leg on the car seat base to protect the infants in the event of a vehicle collision. The car seat base is held against the floor of the vehicle via the stability leg, to prevent the car seat base from accidental rotation relative to the vehicle seat resulted from frontal collision. The conventional stability leg includes two leg tubes and one latch, and the latch constrains relative motion between the two leg tubes. Therefore, the conventional stability leg cannot provide multi-phase adjustment for the infant car seat.

SUMMARY OF THE INVENTION

The present invention provides an infant car seat and a release actuator with an adjustable and easy-to-operation function for solving above drawbacks.

According to the claimed invention, an infant car seat includes a seat base and a stability leg. The stability leg is rotatably disposed under the seat base. The stability leg includes an upper leg tube, a rotary member and a first latch. The upper leg tube includes at least one opening. The rotary member includes a pivoting portion and an encircling portion. The pivoting portion is rotatably connected to the seat base. The encircling portion is connected to the pivoting portion and slidably disposed on the upper leg tube. The first latch is disposed on the rotary member, and adapted to detachably engage with the at least one opening for constraining a movement between the rotary member and the upper leg tube.

According to the claimed invention, the stability leg further includes a lower leg tube and a second latch. The lower leg tube is slidably assembled with the upper leg tube, and includes at least one hole. The second latch is disposed on the upper leg tube, and adapted to detachably engage with the at least one hole for constraining a movement between the upper leg tube and the lower leg tube.

According to the claimed invention, the seat base includes a support frame, and the rotary member further includes a contacting portion adapted to abut against the support frame for constraining a rotation of the stability leg relative to the seat base in an operation mode.

According to the claimed invention, the seat base includes a release actuator adapted to lock the stability leg for steadying the stability leg in a storage mode.

According to the claimed invention, the release actuator includes a handle portion and a locking portion connected to each other. The locking portion is engaged with or disengaged from the stability leg. The handle portion is movably disposed on the seat base and adapted to be applied by an external force for disengaging the locking portion from the stability leg.

According to the claimed invention, the release actuator further includes a connection portion disposed between the handle portion and the locking portion. Two ends of the connection portion are respectively assembled with the handle portion and the locking portion in a movable manner.

According to the claimed invention, the release actuator further includes a first resilient component disposed between the handle portion and the seat base, and further includes a second resilient component disposed between the locking portion and the seat base.

According to the claimed invention, the seat base includes a reclined foot. The release actuator is movably disposed inside the reclined foot. The locking portion is engaged with the stability leg when the handle portion is moved with rotation of the reclined foot via deformation of the first resilient component.

According to the claimed invention, the locking portion has a sunken structure adapted to be applied by an external force for disengaging the locking portion from the stability leg.

According to the claimed invention, the upper leg tube further includes a tube body, a first blocker and a second blocker. The first blocker is disposed on a top section of the tube body and adapted to constrain a downward motion of the upper leg tube relative to the rotary member. The second blocker is disposed on a middle section of the tube body and adapted to constrain an upward motion of the upper leg tube relative to the rotary member.

According to the claimed invention, the first latch includes a first housing, a first button and a first lock. The first button is movably disposed on the first housing. The first lock is movably connected to the first button and disposed inside the first housing for engaging with and disengaging from the at least one opening via motion of the first button.

According to the claimed invention, the first button is moved inside the first housing in a first direction, and the first lock is moved inside the first housing in a second direction similar to or different from the first direction.

According to the claimed invention, the first latch further includes a first recovering component disposed between the first housing and the first button, or between the first housing and the first lock.

According to the claimed invention, the first button includes a first engaging portion, and the first lock includes a second engaging portion movably assembled with the first engaging portion.

According to the claimed invention, the first engaging portion and the second engaging portion respectively are a pin and a slotted structure, and a structural direction of the slotted structure is intersected with the first direction and the second direction.

According to the claimed invention, the second latch includes a second housing, a second button and a second lock. The second button is movably disposed on the second housing. The second lock is connected to the second button and movably disposed inside the second housing for engaging with and disengaging from one of the at least one hole via rotation of the second button.

According to the claimed invention, the second latch further includes a second recovering component disposed between the second housing and the second button.

According to the claimed invention, the second lock is disengaged from the at least one hole via pulling down on the lower leg tube or pressing the second button.

According to the claimed invention, the stability leg further includes a foot housing and an indicator. The foot housing is disposed on a bottom of the lower leg tube. The foot housing has a window. The indicator has a main body, a first indication mark and a second indication mark. The main body is movably disposed inside the foot housing. The first indication mark and the second indication mark are disposed on respective positions on the main body. One of the first indication mark and the second indication mark aligns with the window in response to motion of the main body relative to the foot housing.

According to the claimed invention, the main body has a first end and a second end opposite to each other. The first end is protruded from or accommodated inside a bottom of the foot housing according to motion of the main body. The first indication mark and the second indication mark are disposed on the second end.

According to the claimed invention, the main body is disposed inside the foot housing in a rotatable manner or in a slidable manner.

According to the claimed invention, the indicator further has an elastic component disposed between the main body and the foot housing.

According to the claimed invention, a stability leg includes an upper leg tube, a rotary member and a first latch. The upper leg tube includes at least one opening. The rotary member includes a pivoting portion and an encircling portion. The pivoting portion is rotatably connected to the seat base. The encircling portion is connected to the pivoting portion and slidably disposed on the upper leg tube. The first latch is disposed on the rotary member, and adapted to detachably engage with the at least one opening for constraining a movement between the rotary member and the upper leg tube.

In the embodiment of the present invention, the stability leg has the upper leg tube and the lower leg tube slidably assembled with each other. The first latch is used to constrain the relative movement between the upper leg tube and the rotary member, and the second latch is used to constrain the relative movement between the upper leg tube and the lower leg tube. The gross adjustment of the stability leg can lock the upper leg tube in an upper position for installing the infant car seat in a shorter and center vehicle seat, and further lock the upper leg tube in a lower position for installing the infant car seat in a taller and outboard vehicle seat; the fine adjustment of the stability leg can lock the lower leg tube via one of the holes on the lower leg tube to change an extended length of the stability leg.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
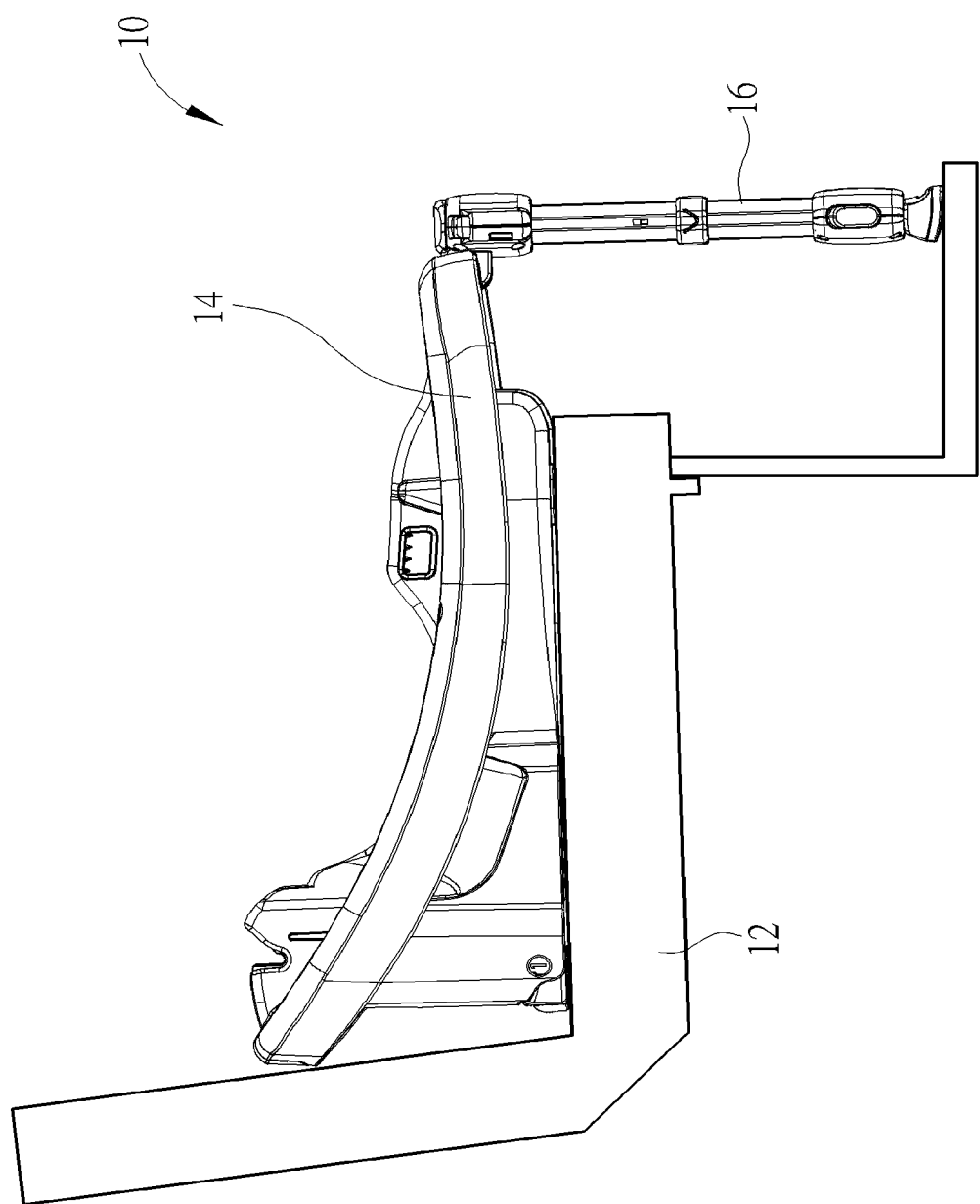
FIG. 1 is a diagram of an infant car seat and a vehicle seat according to an embodiment of the present invention.
Figure 2:
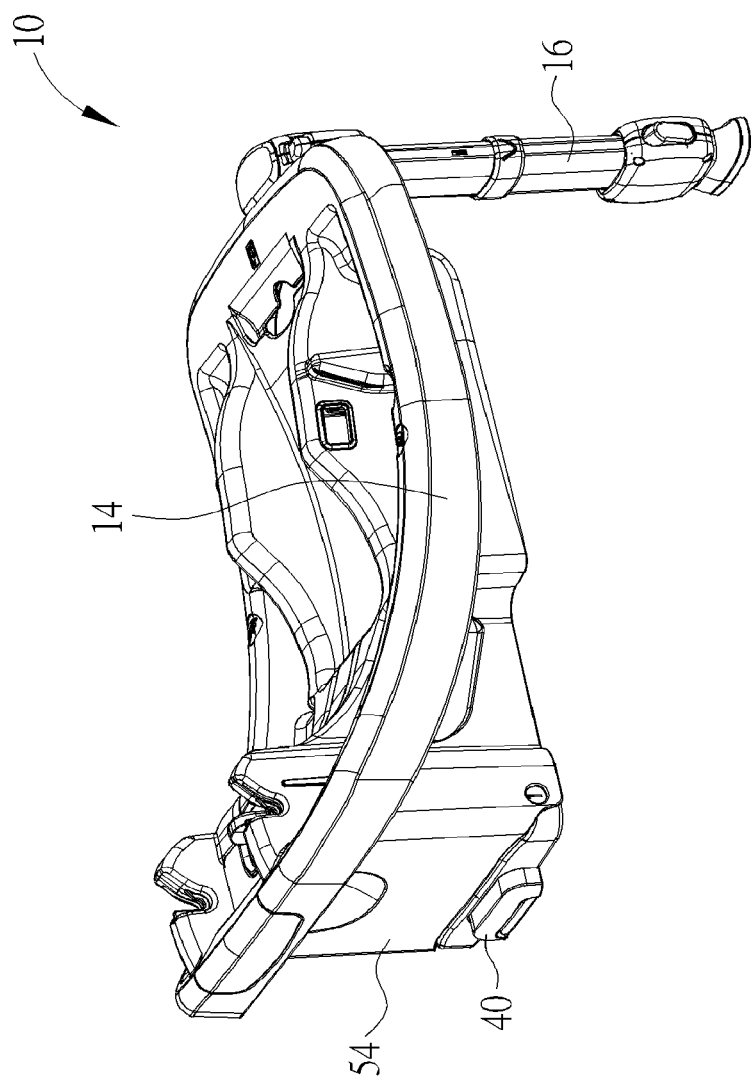
FIG. 2 is a diagram of the infant car seat in an operation mode according to the embodiment of the present invention.
Figure 3:
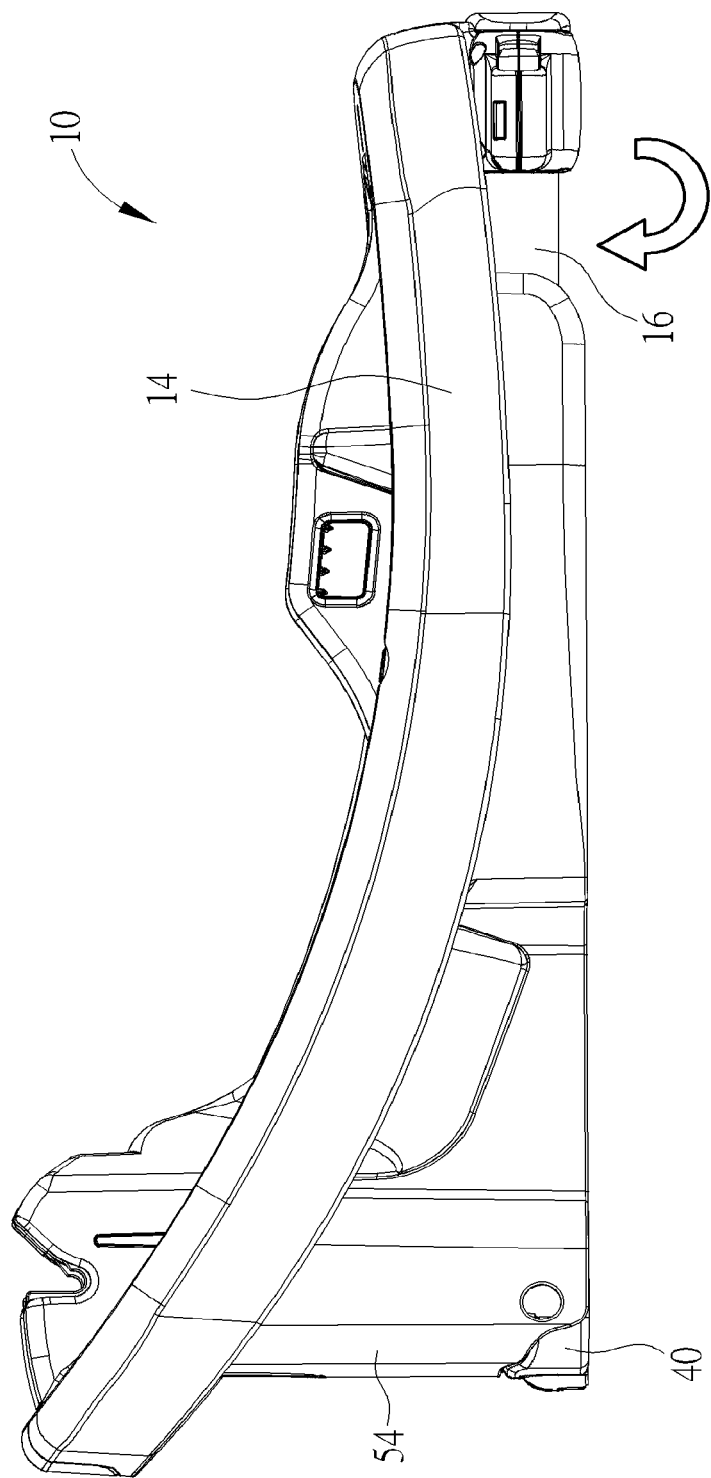
FIG. 3 is a diagram of the infant car seat m a storage mode according to the embodiment of the present invention.

Please refer to FIG. 1 to FIG. 3. FIG. 1 is a diagram of an infant car seat 10 and a vehicle seat 12 according to an embodiment of the present invention. FIG. 2 is a diagram of the infant car seat 10 in an operation mode according to the embodiment of the present invention. FIG. 3 is a diagram of the infant car seat 10 in a storage mode according to the embodiment of the present invention. The infant car seat 10 can be fixed to the vehicle seat 12 and has a safety seat for protecting the child. The infant car seat 10 can include a seat base 14 and a stability leg 16. The seat base 14 can be detachably fixed to the vehicle seat 12 via a latch mechanism, which is not shown in the figure. The stability leg 16 can be rotatably disposed under the seat base 14 for abutting against a vehicle floor. The stability leg 16 can be unfolded to switch the infant car seat 10 in the operation mode, as shown in FIG. 1 and FIG. 2; the stability leg 16 further can be folded to switch the infant car seat 10 in the storage mode, as shown in FIG. 3.

Figure 4:
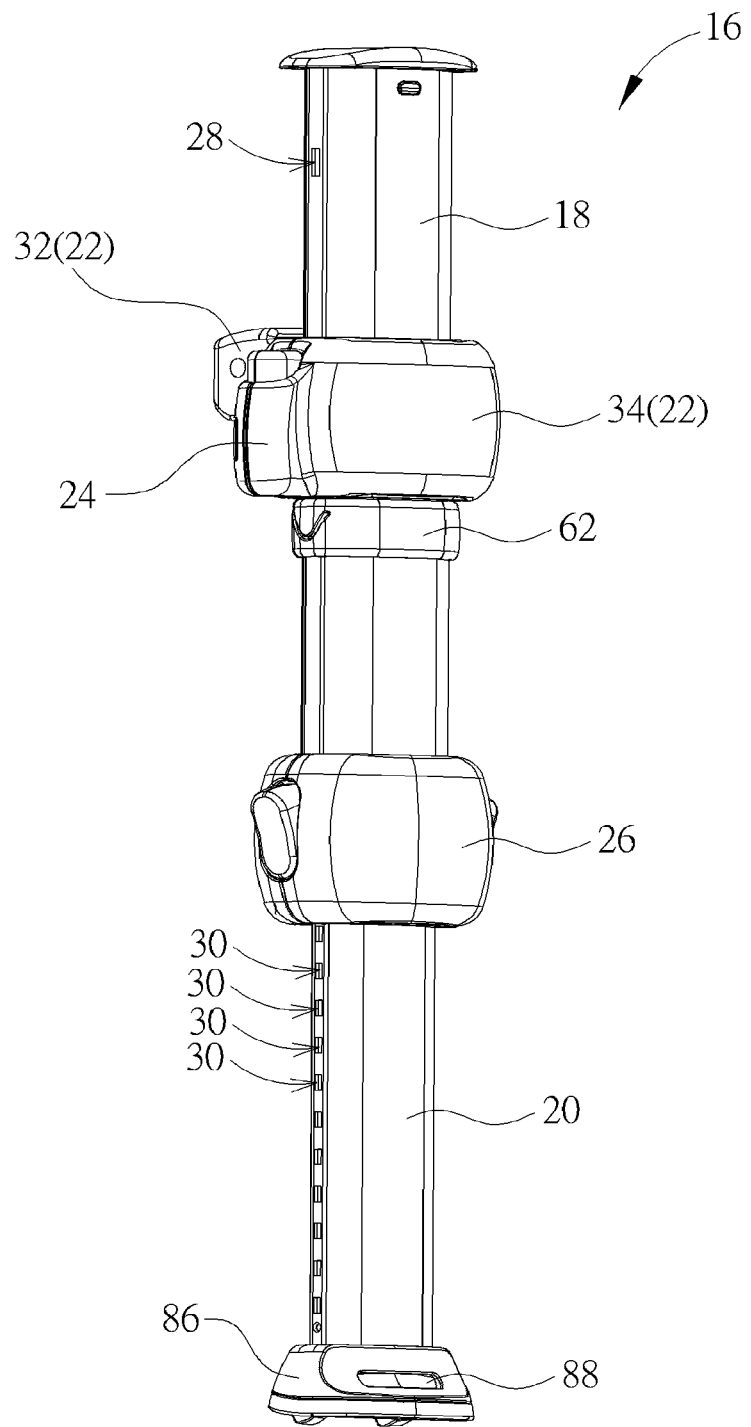
FIG. 4 is a diagram of a stability leg according to the embodiment of the present invention.

Please refer to FIG. 4. FIG. 4 is a diagram of the stability leg 16 according to the embodiment of the present invention. The stability leg 16 can include an upper leg tube 18, a lower leg tube 20, a rotary member 22, a first latch 24 and a second latch 26. The lower leg tube 20 and the second latch 26 may be optional units and can be omitted in some possible embodiment. For example, the upper leg tube 18 can have at least one opening 28, and the rotary member 22 can be movably disposed on the upper leg tube 18, and the first latch 24 can be disposed on the rotary member 22. The first latch 24 can be detachably engaged with the opening 28 to constrain a movement between the rotary member 22 and the upper leg tube 18, so as to adjust a length of the stability leg 16.

In the embodiment, the lower leg tube 20 can be slidably assembled with the upper leg tube 18 and have at least one hole 30, and the second latch 26 can be disposed on the upper leg tube 18. The second latch 26 can detachably engage with the hole 30 to constrain a movement between the upper leg tube 18 and the lower leg tube 20, for adjusting the length of the stability leg 16. The rotary member 22 can include a pivoting portion 32 and an encircling portion 34. The pivoting portion 32 can be rotatably connected to the seat base 14, which means the stability leg 16 can be folded and unfolded relative to the seat base 14 via the pivoting portion 32. The encircling portion 34 can be connected to the pivoting portion 32 and slidably disposed on the upper leg tube 18. The upper leg tube 18 and/or the lower leg tube 20 can be pushed or pulled to change relative position between the encircling portion 34 of the rotary member 22 and the upper leg tube 18.

Figure 5:
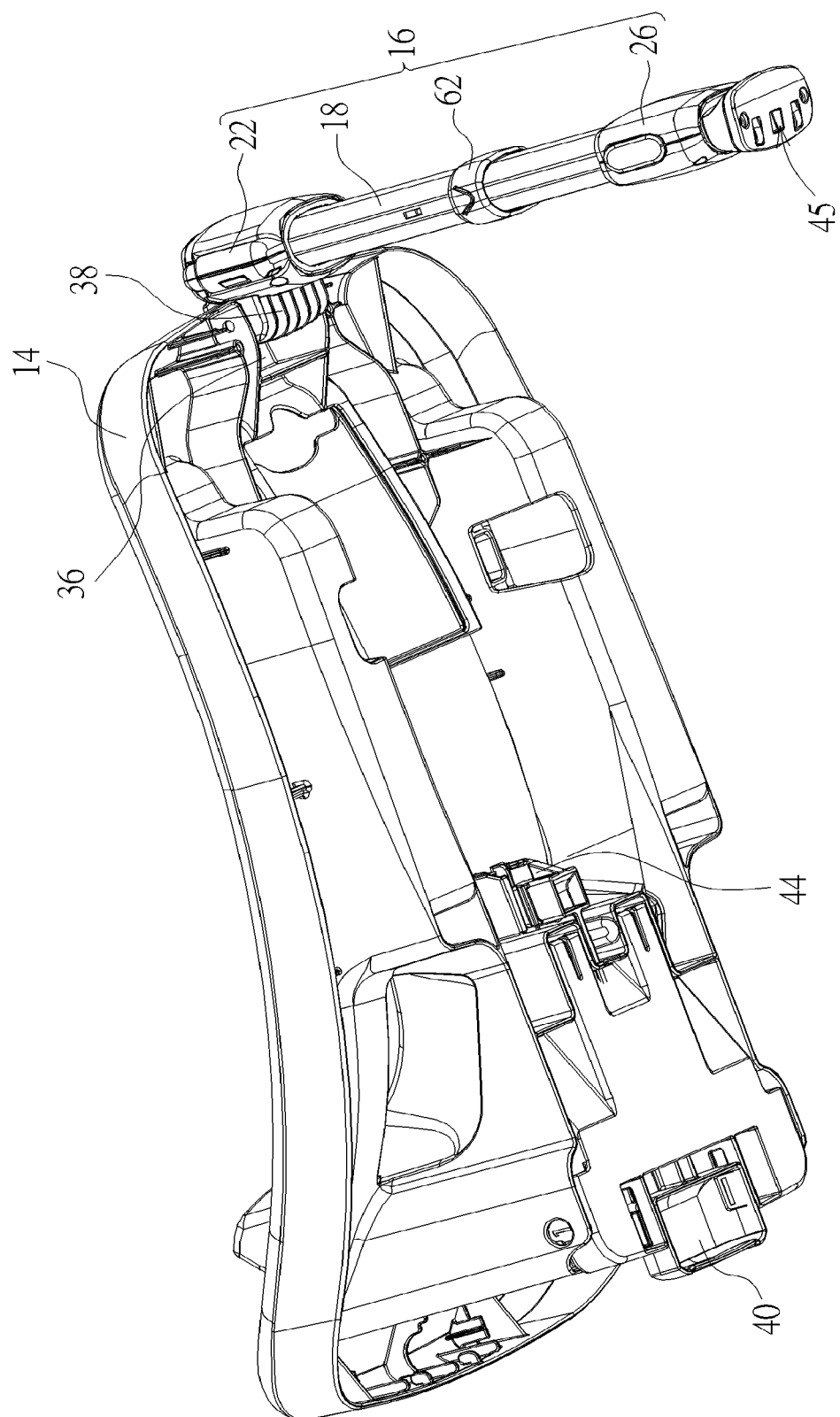
FIG. 5 is a diagram of a part of the infant car seat in the operation mode according to the embodiment of the present invention.
Figure 6:
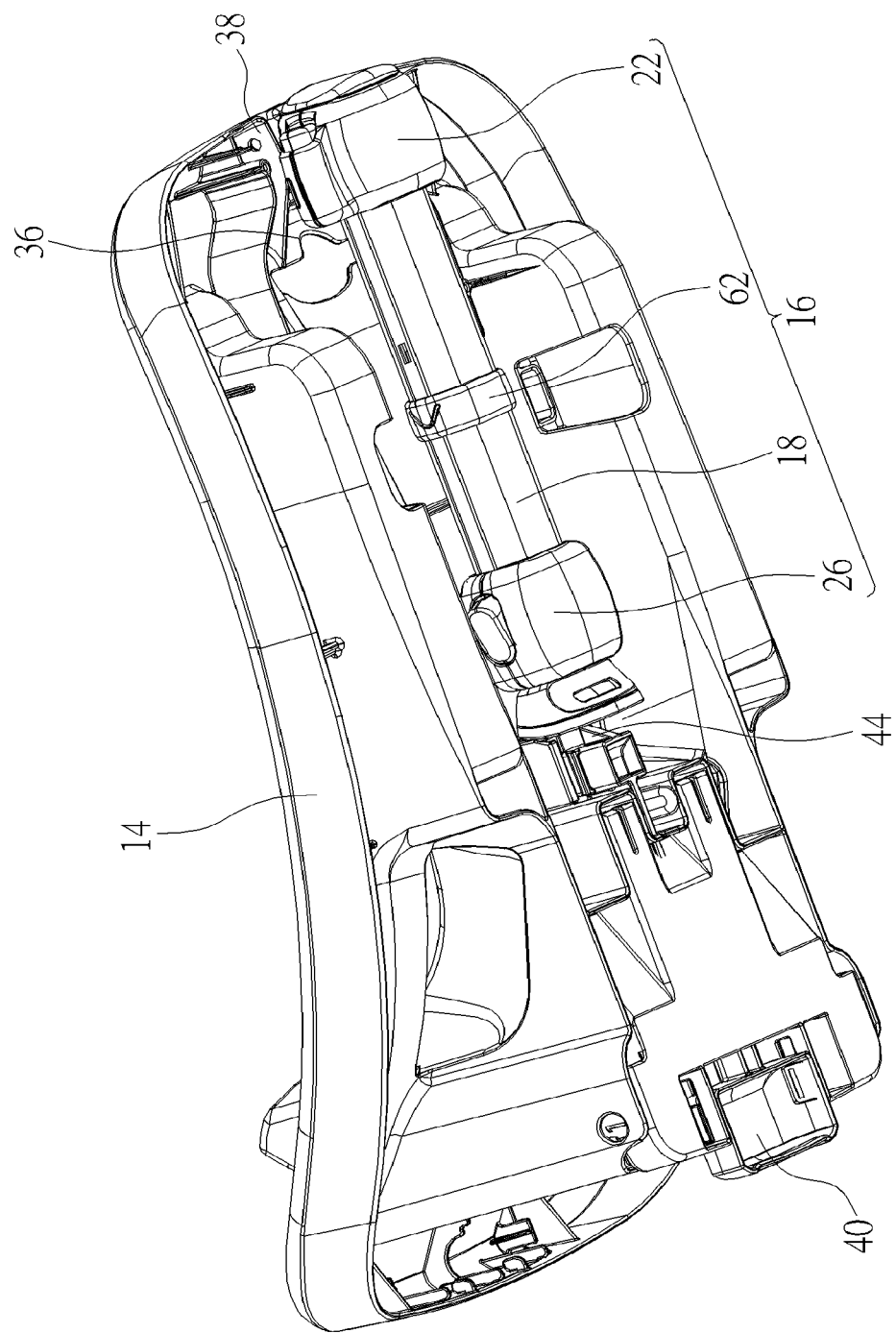
FIG. 6 is a diagram of the part of the infant car seat in the storage mode according to the embodiment of the present invention.

Please refer to FIG. 5 and FIG. 6. FIG. 5 is a diagram of a part of the infant car seat 10 in the operation mode according to the embodiment of the present invention. FIG. 6 is a diagram of the part of the infant car seat 10 in the storage mode according to the embodiment of the present invention. The seat base 14 can include a support frame 36, and the rotary member 22 can further include a contacting portion 38. As shown in FIG. 5, the stability leg 16 is unfolded, and the contacting portion 38 can abut against the support frame 36 to constrain a further rotation of the stability leg 16 relative to the seat base 14. As shown in FIG. 6, the stability leg 16 is folded, and the contacting portion 38 can be away from the support frame 36.

Figure 7:
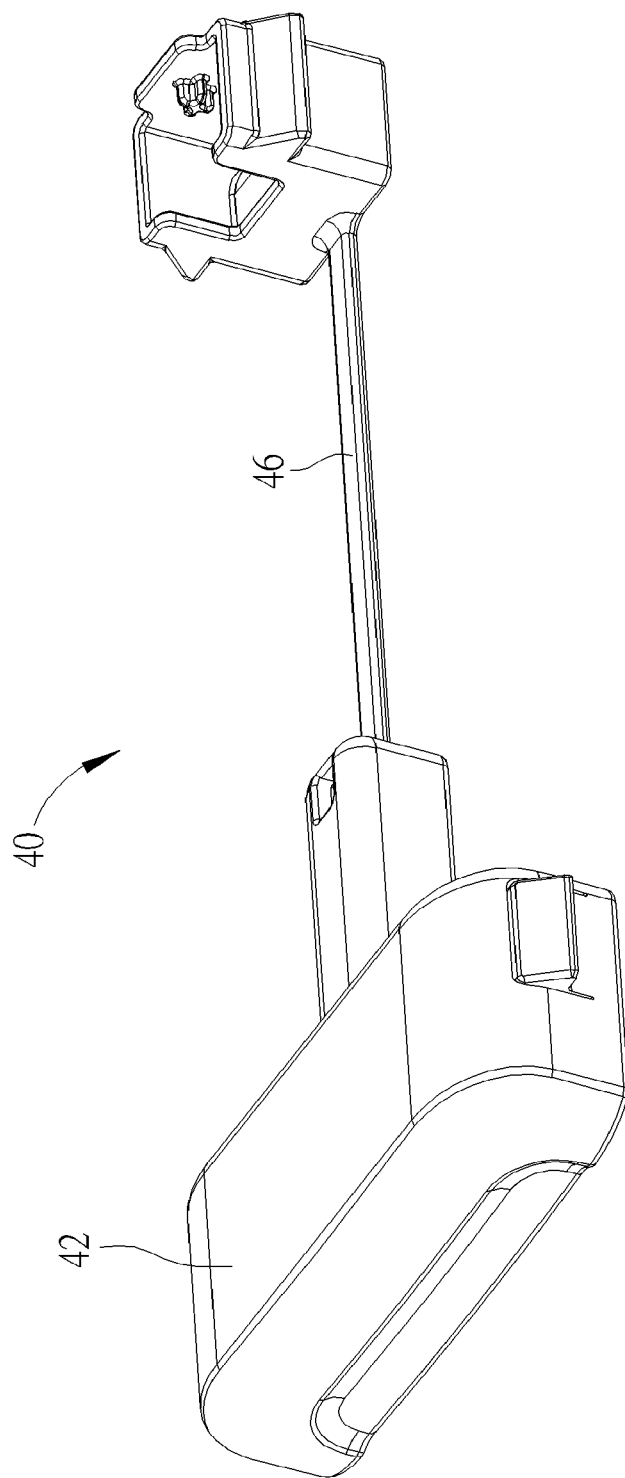
FIG. 7 is a diagram of a release actuator of a seat base according to the embodiment of the present invention.
Figure 8:
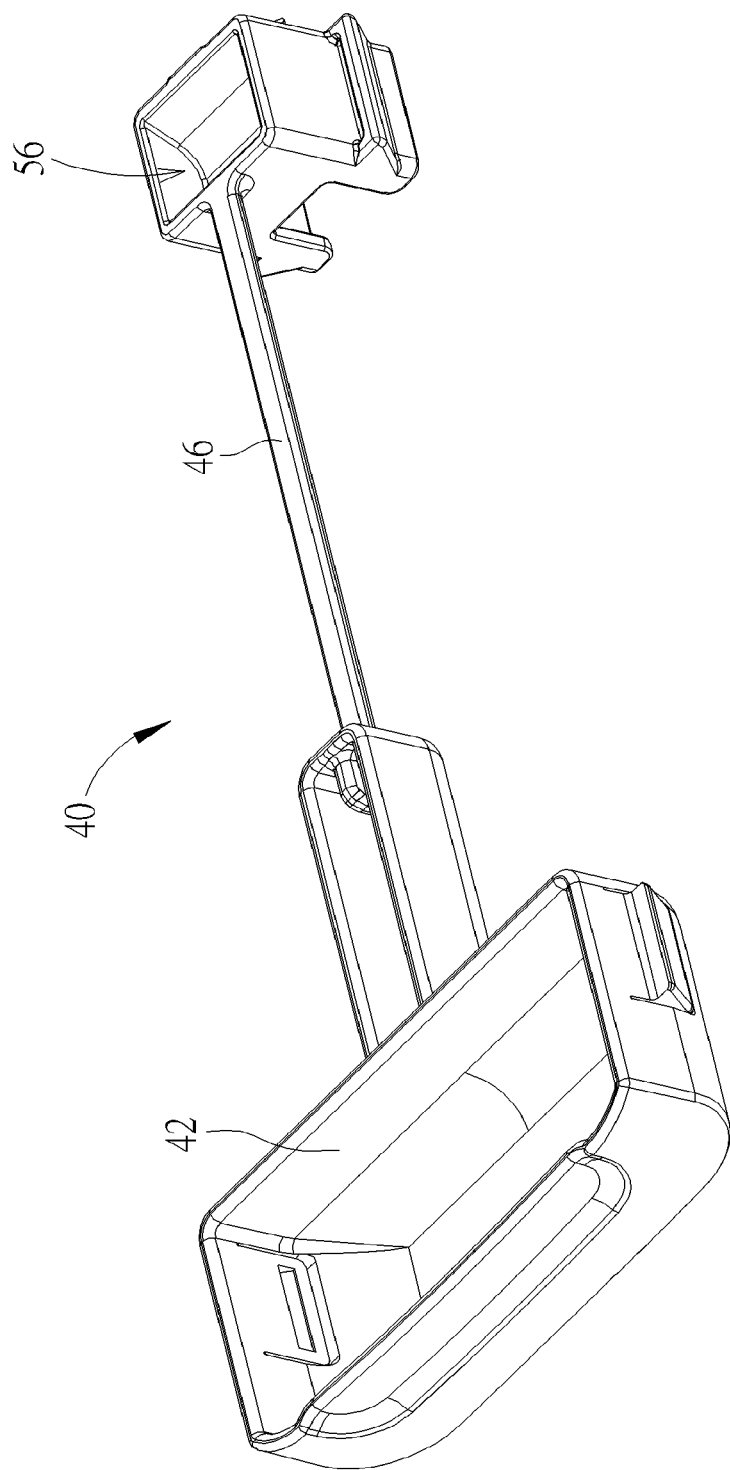
FIG. 8 is a diagram of the release actuator m another view according to the embodiment of the present invention.
Figure 9:
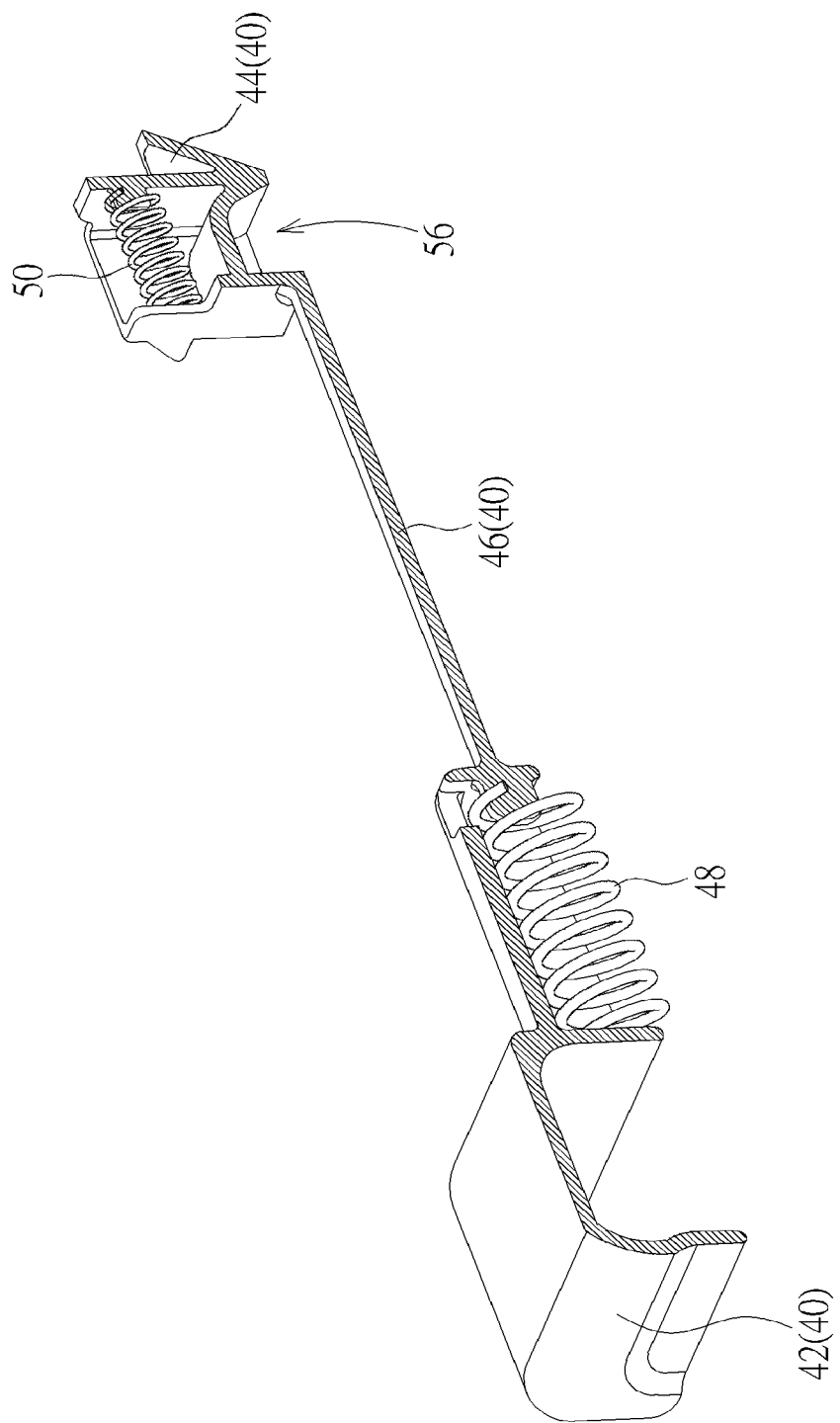
FIG. 9 is a diagram of a part of the seat base according to the embodiment of the present invention.
Figure 10:
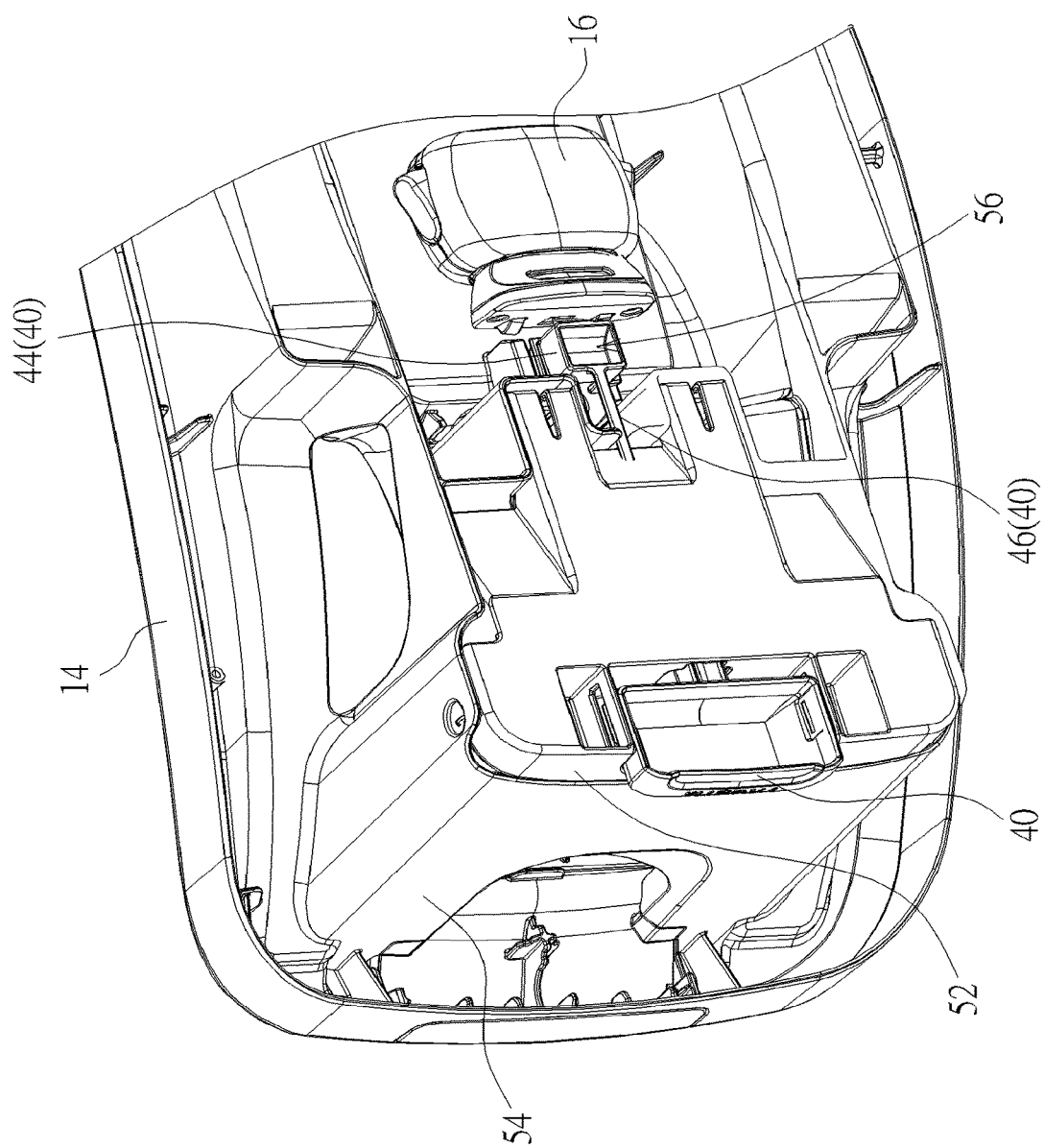
FIG. 10 is a diagram of another part of the seat base according to the embodiment of the present invention.

Please refer to FIG. 2 and FIG. 7 to FIG. 10. FIG. 7 is a diagram of a release actuator 40 of the seat base 14 according to the embodiment of the present invention. FIG. 8 is a diagram of the release actuator 40 in another view according to the embodiment of the present invention. FIG. 9 is a diagram of a part of the seat base 14 according to the embodiment of the present invention. FIG. 10 is a diagram of another part of the seat base 14 according to the embodiment of the present invention. The release actuator 40 can be operated to lock the stability leg 16 to steady the stability leg 16 in the storage mode. The release actuator 40 can include a handle portion 42, a locking portion 44 and a connection portion 46 connected to each other. The connection portion 46 can be disposed between the handle portion 42 and the locking portion 44.

The handle portion 42 can be movably disposed on the seat base 14. The locking portion 44 can be engaged with or disengaged from a locked slot 45 formed on a lowest part of the stability leg 16. Two ends of the connection portion 46 can be respectively assembled with the handle portion 42 and the locking portion 44 in a movable manner. In addition, a first resilient component 48 can be disposed between the handle portion 42 and the seat base 14, and a second resilient component 50 can be disposed between the locking portion 44 and the seat base 14. If an external force is applied to the handle portion 42 for pulling out, the connection portion 46 can be driven by the handle portion 42 to pull out the locking portion 44 for disengaging the release actuator 40 from the stability leg 16. If the external force is removed, a resilient recovering force of the first resilient component 48 can move the handle portion 42 into the seat base 14, and a resilient recovering force of the second resilient component 50 can move the locking portion 44 back to an initial position.

Moreover, the seat base 14 can include a reclined foot 52, and the release actuator 40 can be movably disposed inside the reclined foot 52. If a height of the infant car seat 10 is intending to change, the reclined foot 52 can be rotated to protrude from or get back into a housing 54 of the seat base 14, and the first resilient component 48 can be deformed to adjust the connection portion 46, for allowing motion of the handle portion 42 due to rotation of the reclined foot 52, and keeping the locking portion 44 stably engaged with the stability leg 16. The connection portion 46 may be a flexible strap or solid material.

In a possible situation, the locking portion 44 can have a sunken structure 56. The external force may be applied to the sunken structure 56 of the locking portion 44 for pulling out, and the locking portion 44 can be disengaged from the stability leg 16. When the external force is removed, the resilient recovering force of the second resilient component 50 can move the locking portion 44 back to the initial position, for engaging with the stability leg 16.

Figure 11:
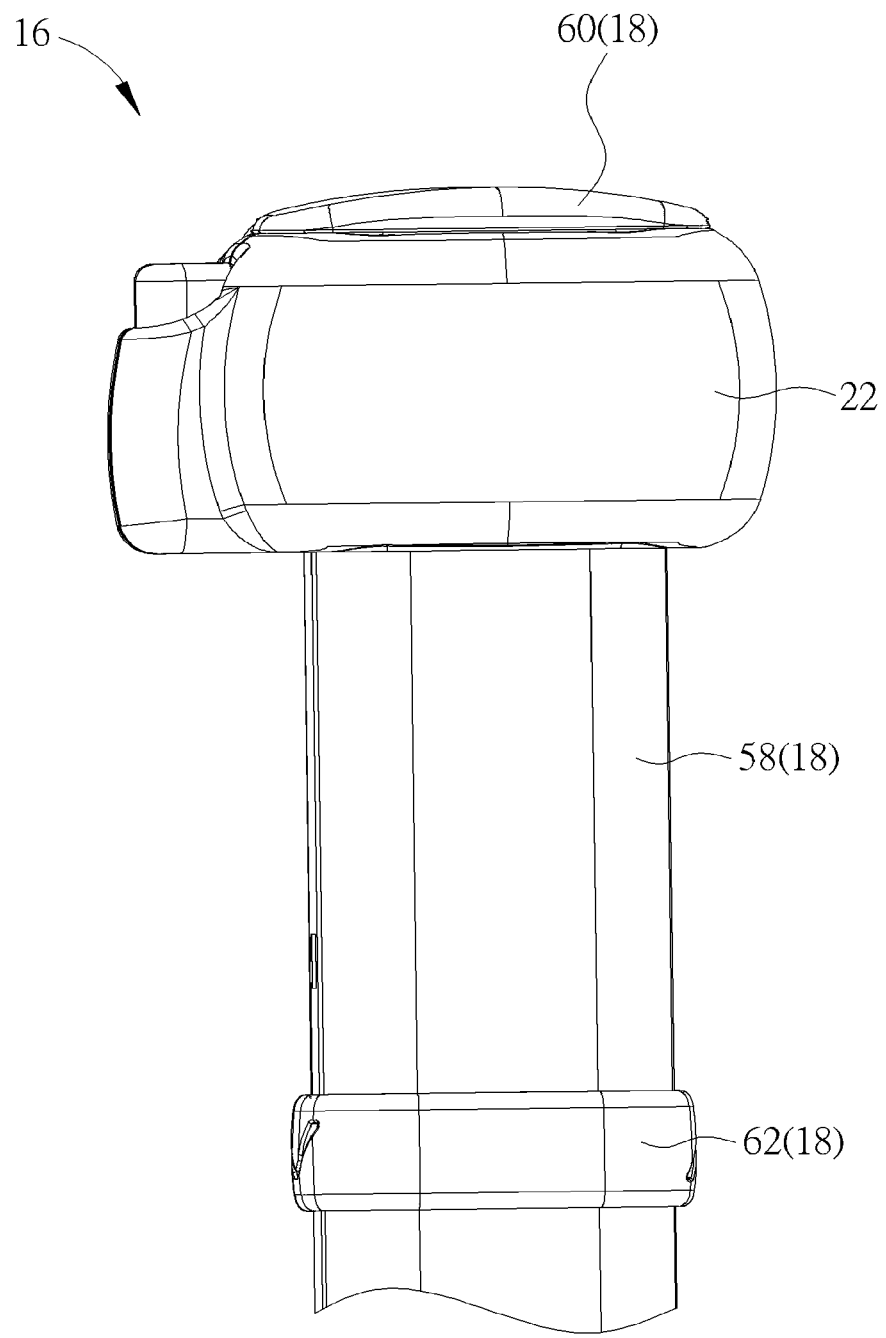
FIG. 11 is a diagram of the stability leg in a downward mode according to the embodiment of the present invention.
Figure 12:
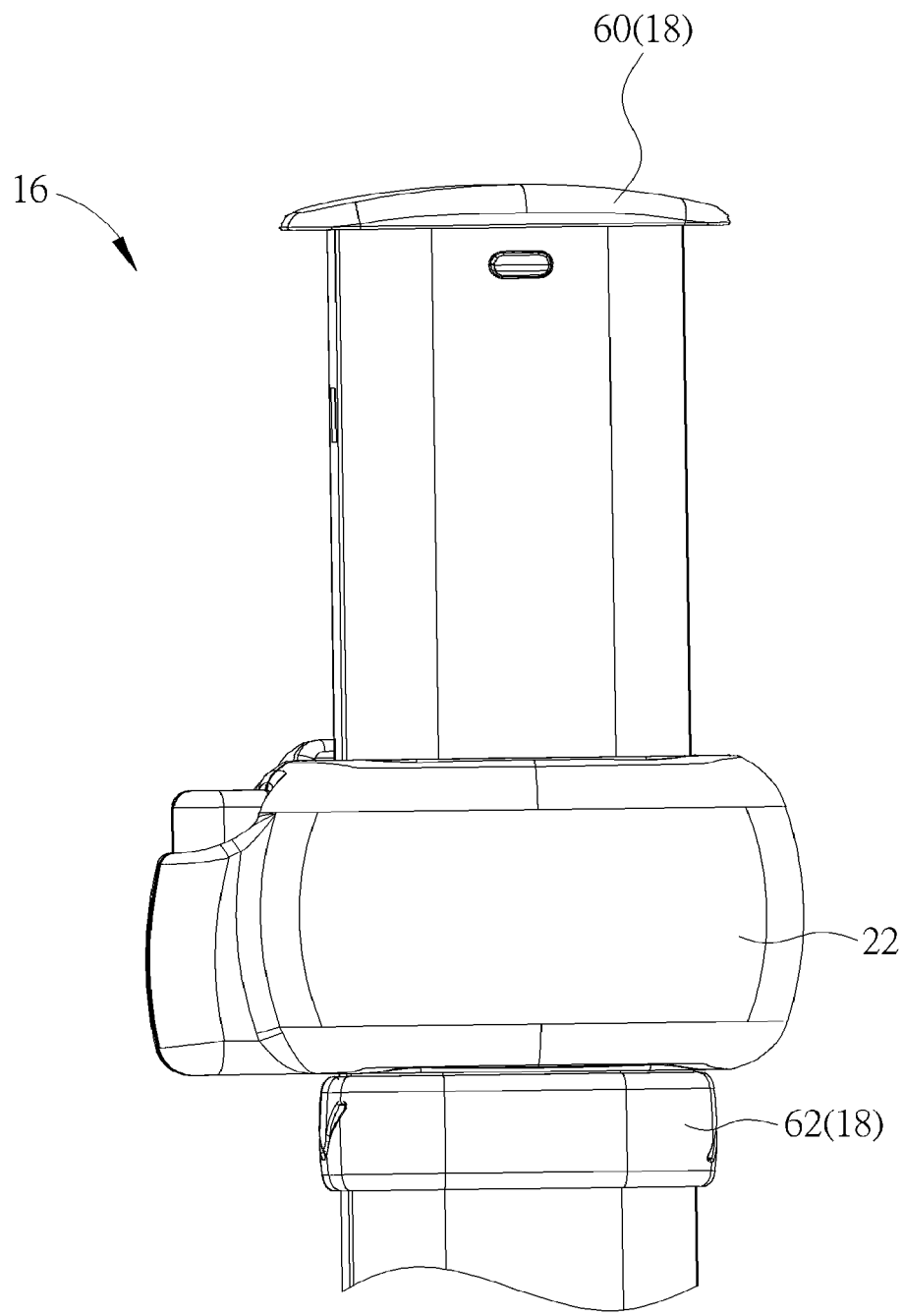
FIG. 12 is a diagram of the stability leg m an upward mode according to the embodiment of the present invention.

Please refer to FIG. 11 and FIG. 12. FIG. 11 is a diagram of the stability leg 16 in a downward mode according to the embodiment of the present invention. FIG. 12 is a diagram of the stability leg 16 in an upward mode according to the embodiment of the present invention. The upper leg tube 18 can further include a tube body 58, a first blocker 60 and a second blocker 62. The first blocker 60 can be disposed on a top section of the tube body 58. The second blocker 62 can be disposed on a middle section of the tube body 58. When the upper leg tube 18 is moved downward relative to the rotary member 22, the first blocker 60 can abut against the rotary member 22 to constrain a downward motion of the upper leg tube 18. When the upper leg tube 18 is moved upward relative to the rotary member 22, the second blocker 62 can abut against the rotary member 22 to constrain upward motion of the upper leg tube 18.

Figure 13:
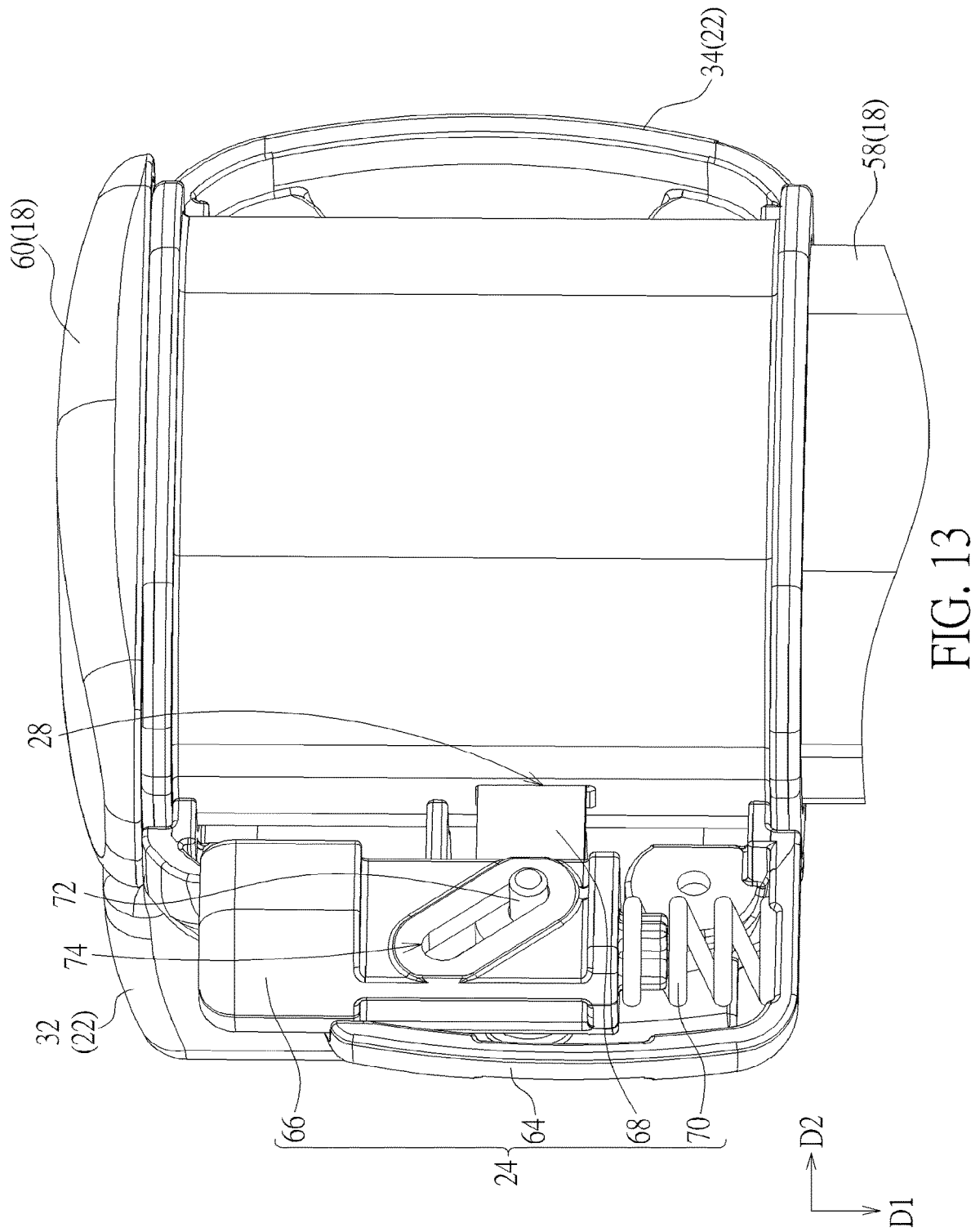
FIG. 13 is a diagram of an upper leg tube, a rotary member and a first latch in a locking mode according to the embodiment of the present invention.
Figure 14:
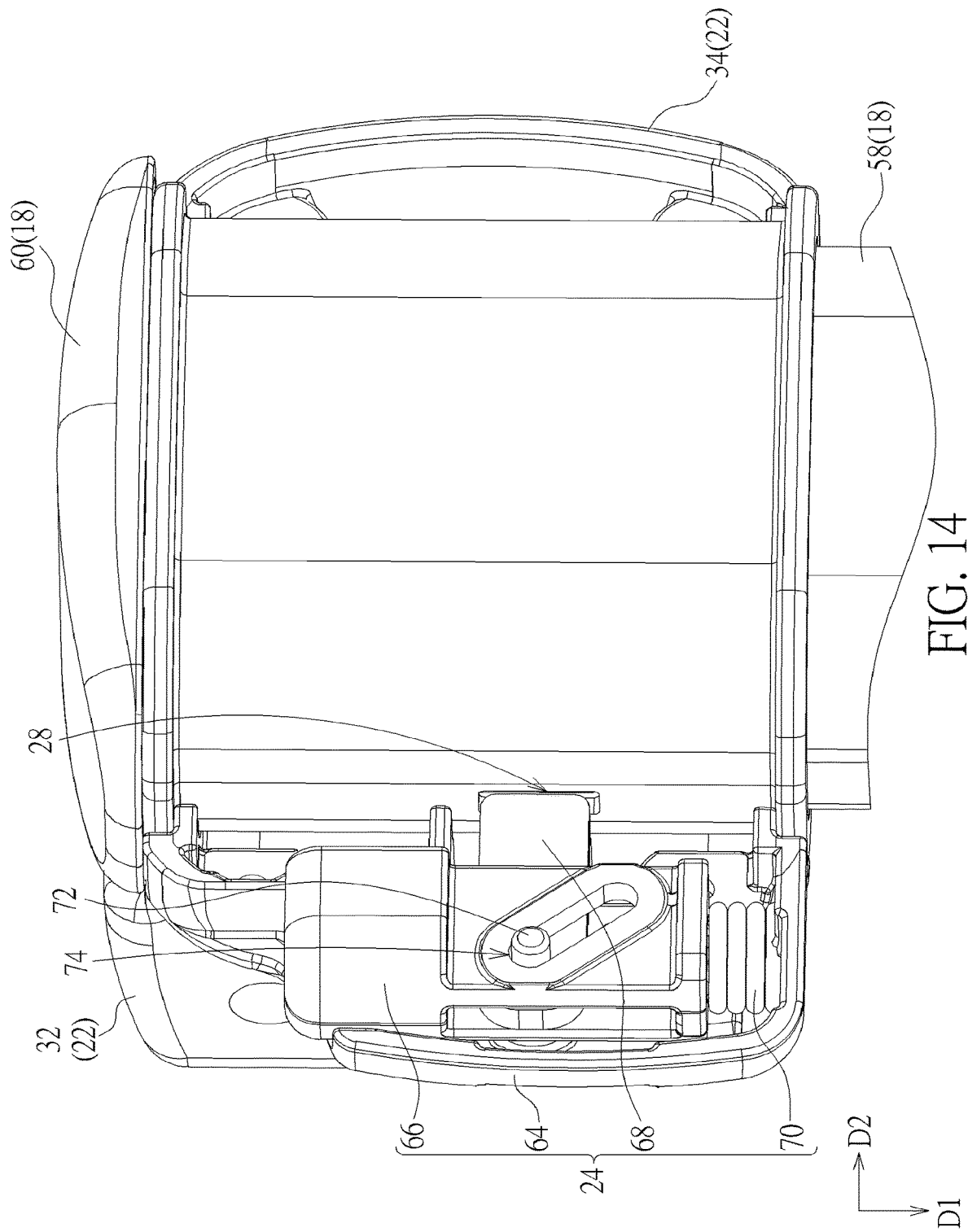
FIG. 14 is a diagram of the upper leg tube, the rotary member and the first latch in an unlocking mode according to the embodiment of the present invention.

Please refer to FIG. 11 to FIG. 14. FIG. 13 is a diagram of the upper leg tube 18, the rotary member 22 and the first latch 24 in a locking mode according to the embodiment of the present invention. FIG. 14 is a diagram of the upper leg tube 18, the rotary member 22 and the first latch 24 in an unlocking mode according to the embodiment of the present invention. The first latch 24 can include a first housing 64, a first button 66, a first lock 68 and a first recovering component 70. The first button 66 can be movably disposed on the first housing 64. The first lock 68 can be movably connected to the first button 66 and disposed inside the first housing 64. The first recovering component 70 can be disposed between the first button 66 and the first housing 64, or between the first lock 68 and the first housing 64. If the external force is applied to the first button 66, the first button 66 can be moved to actuate and disengage the first lock 68 from the opening 28 on the upper leg tube 18. If the external force is removed, a resilient recovering force of the first recovering component 70 can move and engage the first lock 68 with the opening 28 on the upper leg tube 18.

In the embodiment, the first button 66 can be moved inside the first housing 64 in a first direction D1, and the first lock 68 can be moved inside the first housing 64 in a second direction D2. The first direction D1 can be perpendicular to the second direction D2 according to structural design of the first button 66 and the first lock 68. For example, the first button 66 can include a first engaging portion 72, and the first lock 68 can include a second engaging portion 74 movably assembled with the first engaging portion 72. The first engaging portion 72 and the second engaging portion 74 respectively can be a pin and a slotted structure. A structural direction of the slotted structure can be intersected with the first direction D1 and the second direction D2, so that relative motion between the first engaging portion 72 and the second engaging portion 74 can transform the external force in the first direction D1 into a pushing force applied to the first lock 68 in the second direction D2.

In other possible embodiments, the first button 66 may be turned to the left at ninety degrees, so the first button 66 can be moved in the first direction D1 similar to the first lock 68 moved in the second direction D2, and a structural length direction of the first button 66 can be parallel to a structural length direction of the first lock 68, which is not shown in the figures. The external force can push the first button 66 from the left to the right, to actuate and engage the first lock 68 with the opening 28 on the upper leg tube 18; when the external force is removed, the resilient recovering force of the first recovering component 70 can move and disengage the first lock 68 from the opening 28 on the upper leg tube 18. Besides, the first button 66 may be rotated in a clockwise direction or in a counterclockwise direction for actuating the first lock 68, which depends on a design demand, and a detailed description is omitted herein for simplicity.

Figure 15:
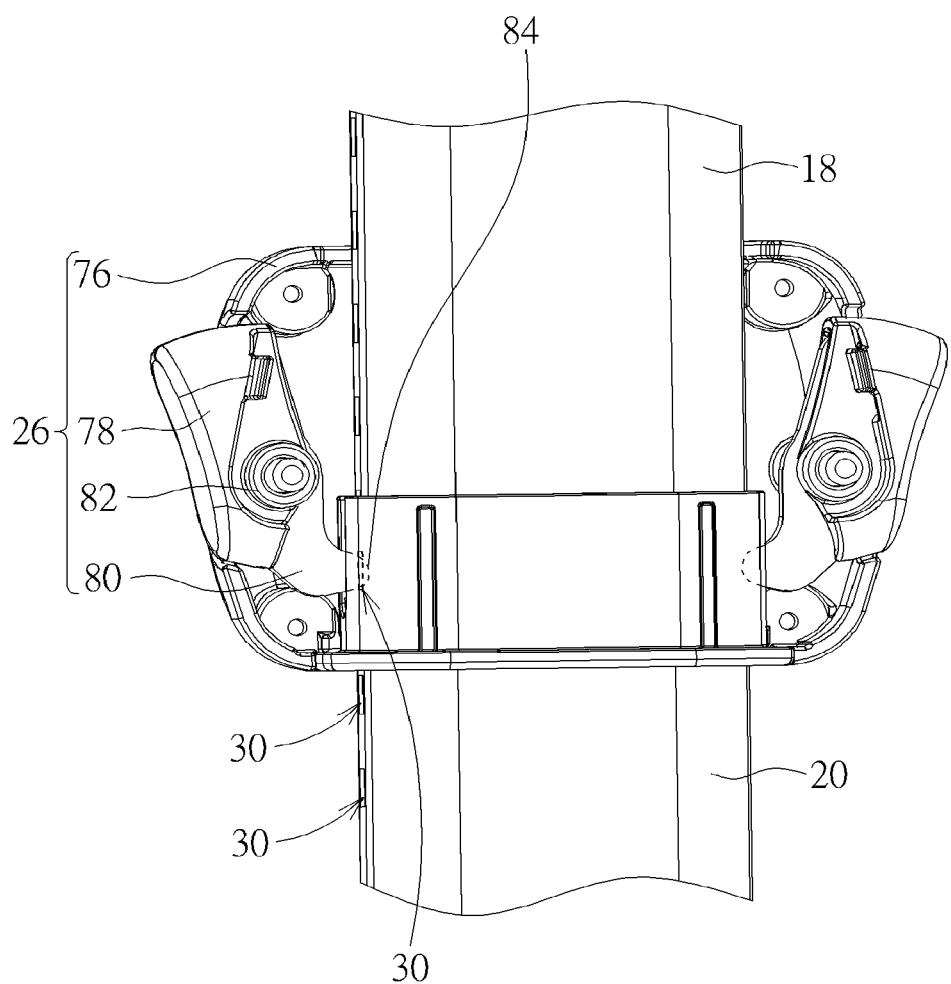
FIG. 15 is a diagram of the upper leg tube, the lower leg tube and the second latch in the lock mode according to the embodiment of the present invention.
Figure 16:
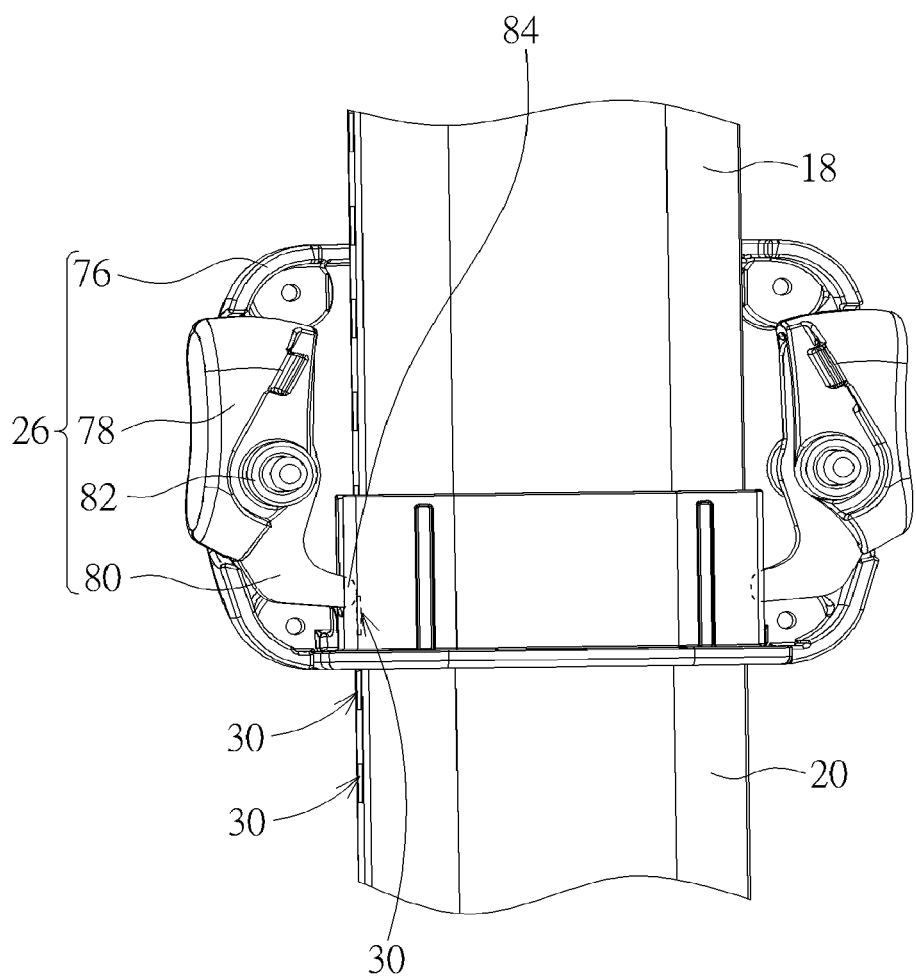
FIG. 16 is a diagram of the upper leg tube, the lower leg tube and the second latch in the unlock mode according to the embodiment of the present invention.

Please refer to FIG. 15 and FIG. 16. FIG. 15 is a diagram of the upper leg tube 18, the lower leg tube 20 and the second latch 26 in the lock mode according to the embodiment of the present invention. FIG. 16 is a diagram of the upper leg tube 18, the lower leg tube 20 and the second latch 26 in the unlock mode according to the embodiment of the present invention. The second latch 26 can include a second housing 76, a second button 78, a second lock 80 and a second recovering component 82. The second button 78 can be movably disposed inside the second housing 76. The second lock 80 can be connected to the second button 78 and movably disposed inside the second housing 76. The second recovering component 82 can be disposed between the second housing 76 and the second button 78, or between the second housing 76 and the second lock 80.

In the embodiment, the second button 78 can be rotatably disposed inside the second housing 76. A part of the second button 78 can be protruded from the second housing 76, and the other part of the second button 78 can be accommodated inside the second housing 76 to abut against the second lock 80 in a detachable manner or in an undetachable manner. If the external force is applied to the second button 78, the second button 78 can be rotated in the counterclockwise direction to drive and disengage the second lock 80 from the hole 30 on the lower leg tube 20, and then the lower leg tube 20 can be slid relative to the upper leg tube 18, as conditions shown in FIG. 15 to FIG. 16. If the external force is removed, a resilient recovering force of the second recovering component 82 can rotate the second button 78 in the clockwise direction, and the second lock 80 can be driven to pierce through the upper leg tube 18 and engage with the hole 30 on the lower leg tube 20; thus, the lower leg tube 20 cannot be slid relative to the upper leg tube 18, as conditions shown in FIG. 16 to FIG. 15.

In some possible embodiments, the resilient recovering force of the second recovering component 82 may rotate the second lock 80 for engaging the second lock 80 with the hole 30 on the lower leg tube 20. Besides, the second button 78 and the second lock 80 may be set as linear slide design; for example, the second button 78 may be pushed or pulled to move in a straight direction, and the second lock 80 may be actuated by the second button 78 to move in another straight direction similar to or different from the foresaid straight direction.

The second lock 80 of the second latch 26 can have a specifically inclined guiding structure 84 disposed on a front end of the second lock 80. When the second lock 80 is inserted into the hole 30 on the lower leg tube 20, the inclined guiding structure 84 can be pressed by the downwardly moved lower leg tube 20 to disengage the second lock 80 from the hole 30 on the lower leg tube 20. The stability leg 16 can be stretched by at least two ways. One way is pulling down on the lower leg tube 20; the second lock 80 can be pressed by the lower leg tube 20 to disengage from the lower leg tube 20, and then the lower leg tube 20 can be downward moved relative to the upper leg tube 18. Another way is pressing the second button 78; the second button 78 can be rotated or shifted to actuate disengagement of the second lock 80 and the lower leg tube 20.

Figure 17:
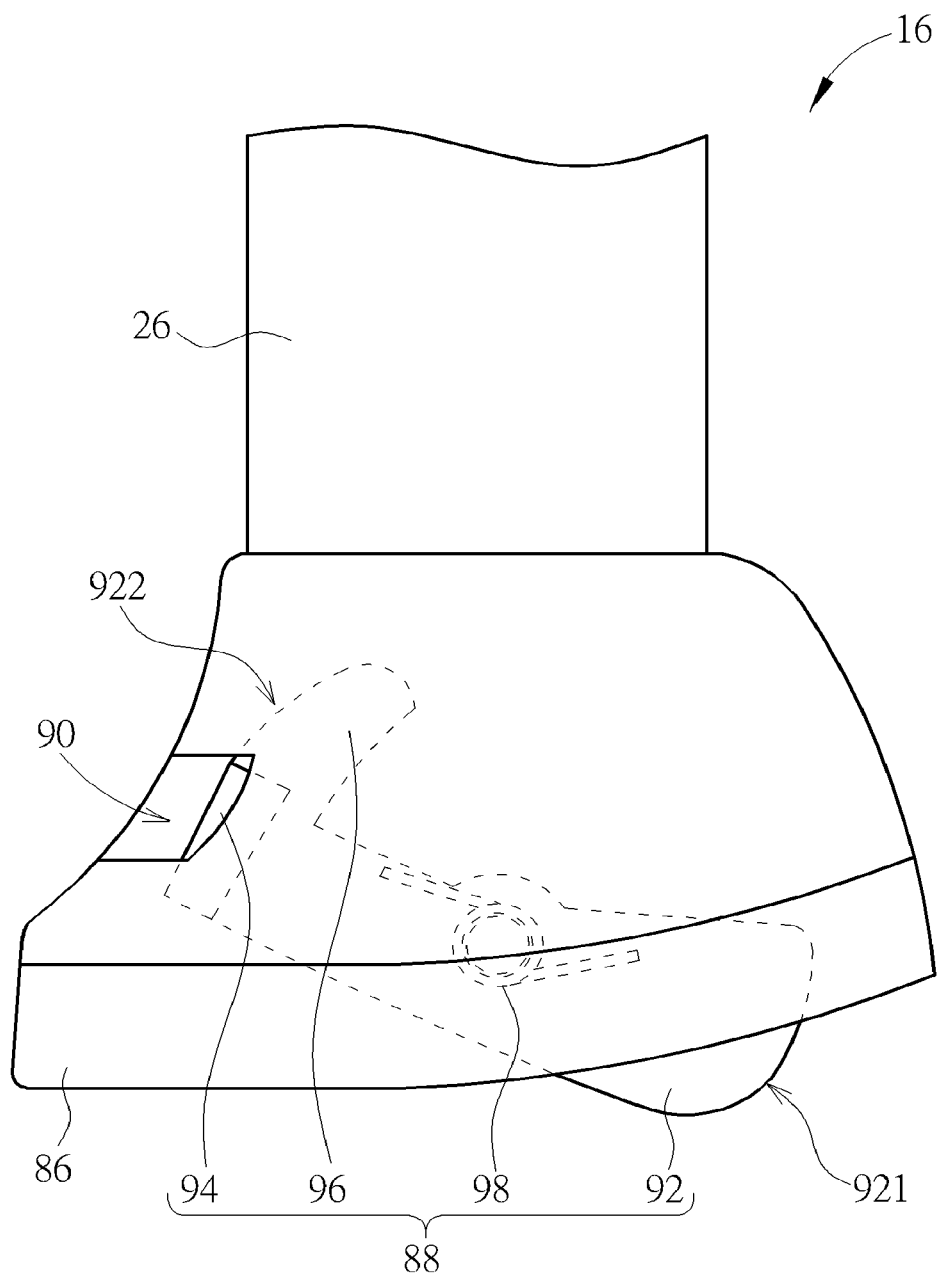
FIG. 17 is a side view of a bottom of the stability leg in a non-contact mode according to the embodiment of the present invention.
Figure 18:
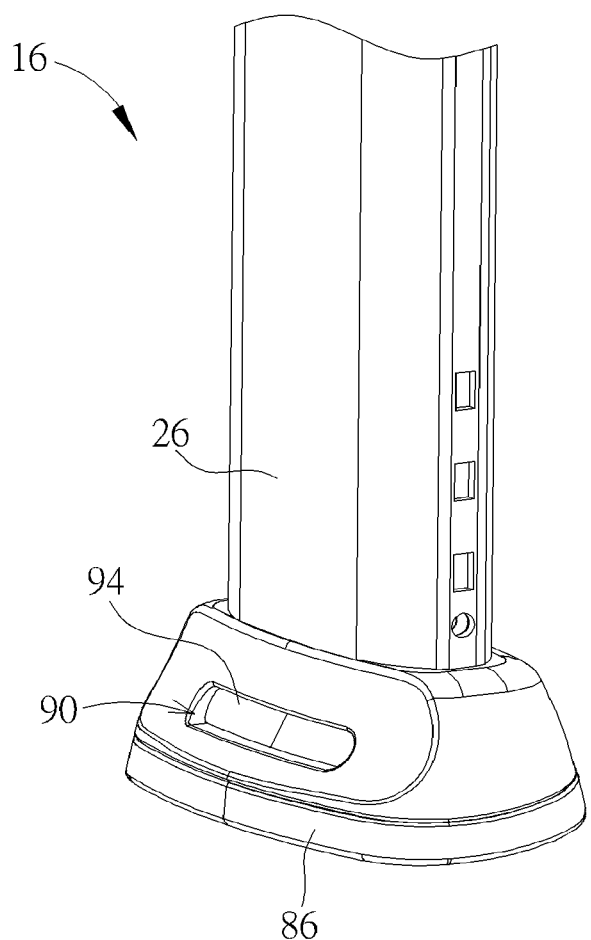
FIG. 18 is a front view of the stability leg in the non-contact mode according to the embodiment of the present invention.
Figure 19:
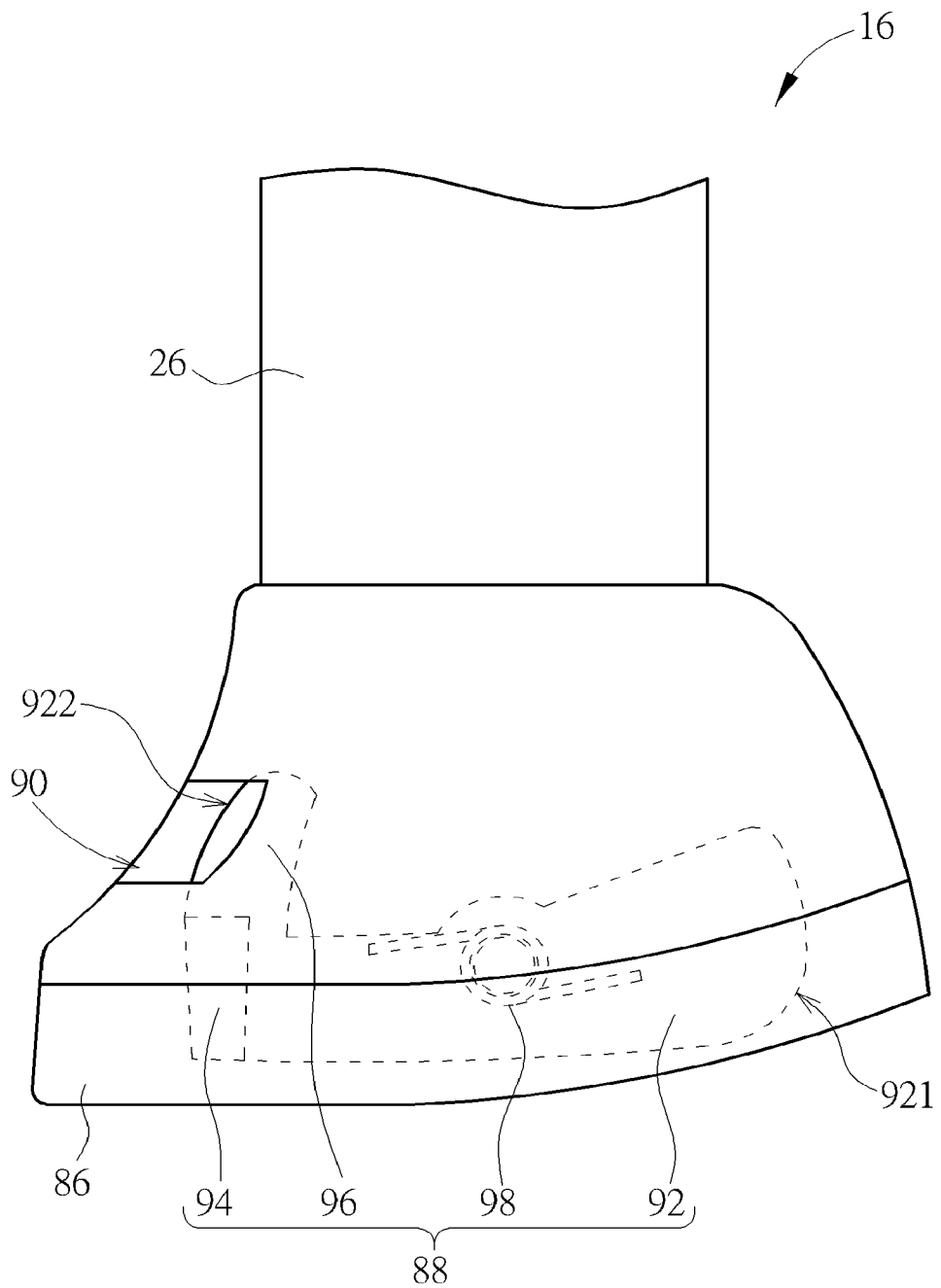
FIG. 19 is a side view of the bottom of the stability leg in a contact mode according to the embodiment of the present invention.
Figure 20:
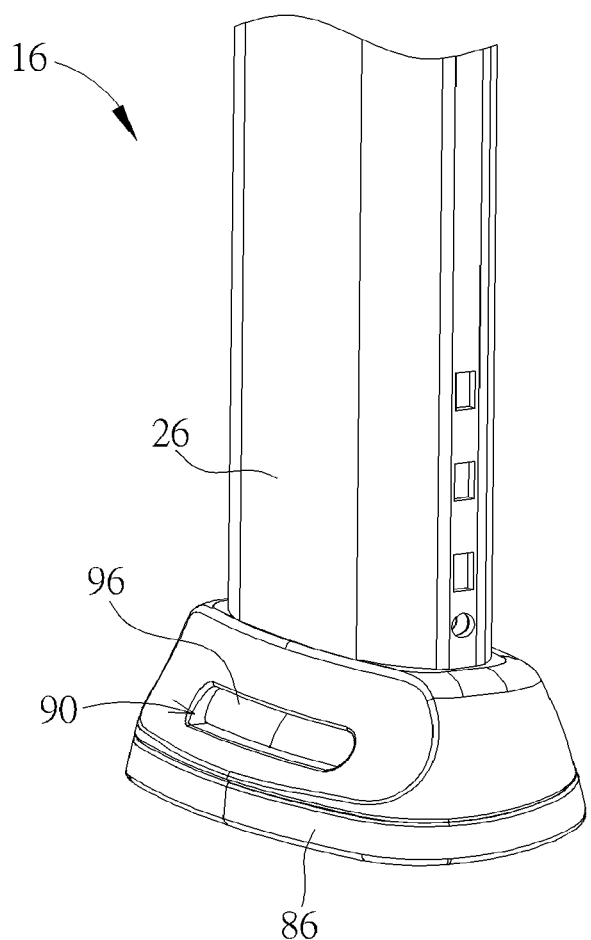
FIG. 20 is a front view of the stability leg in the contact mode according to the embodiment of the present invention.

Please refer to FIG. 17 to FIG. 20. FIG. 17 is a side view of a bottom of the stability leg 16 in a non-contact mode according to the embodiment of the present invention. FIG. 18 is a front view of the stability leg 16 in the non-contact mode according to the embodiment of the present invention. FIG. 19 is a side view of the bottom of the stability leg 16 in a contact mode according to the embodiment of the present invention. FIG. 20 is a front view of the stability leg 16 in the contact mode according to the embodiment of the present invention.

The stability leg 16 can further include a foot housing 86 and an indicator 88. The foot housing 86 can be disposed on a bottom of the lower leg tube 20, and have a window 90 formed on a front surface of the foot housing 86. The indicator 88 can include a main body 92, a first indication mark 94, a second indication mark 96 and an elastic component 98. The main body 92 can be movably disposed inside the foot housing 86. The first indication mark 94 and the second indication mark 96 can be disposed on respective positions on the main body 92. The elastic component 98 can be disposed between the main body 92 and the foot housing 86.

The main body 92 can be disposed inside the foot housing 86 in a rotatable manner or in a slidable manner. In the embodiment, the main body 92 is rotatable inside the foot housing 86. The main body 92 can have a first end 921 and a second end 922 opposite to each other. The first end 921 can be protruded from or accommodated inside a bottom of the foot housing 86 according to motion of the main body 92. The first indication mark 94 can be a red color mark formed on a lower position on the second end 922 of the main body 92, and the second indication mark 96 can be a green color mark formed on an upper position on the second end 922 of the man body 92.

If the stability leg 16 is suspended and does not abut against the vehicle floor, the first end 921 can be protruded from the bottom of the foot housing 86, and the second end 922 can be located at high position to align the first indication mark 94 with the window 90, as shown in FIG. 17 and FIG. 18; the exposed red color mark represents the infant car seat 10 is in an incorrect installed mode. If the stability leg 16 is lowered to abut against the vehicle floor, the first end 921 can be rotated in the counterclockwise direction by pressure to accommodate inside the bottom of the foot housing 86, and the second end 922 can be moved downward to align the second indication mark 96 with the window 90, as shown in FIG. 19 and FIG. 20; the exposed green color mark represents the infant car seat 10 is in a correct installed mode. When the stability leg 16 is lifted, a resilient recovering force of the elastic component 98 can rotate the main body 92 in the clockwise direction to align the first indication mark 94 with the window 90.

As shown in FIG. 4 and FIG. 11 to FIG. 16, an amount of the opening 28 can be less than an amount of the hole 30, so the first latch 24 can be used as gross adjustment, and the second latch 26 can be used as fine adjustment. Relative motion between the first latch 24 and the upper leg tube 18 can be executed for a start to rapidly extend the indicator 88 close to the vehicle floor; then, relative motion between the second latch 26 and the lower leg tube 20 can be executed to abut the indicator 88 against the vehicle floor tightly. When the infant car seat 10 is folded, the gross adjustment and the fine adjustment can be executed simultaneously or individually in accordance with an operation custom.

In the embodiment of the present invention, the stability leg has the upper leg tube and the lower leg tube slidably assembled with each other. The first latch is used to constrain the relative movement between the upper leg tube and the rotary member, and the second latch is used to constrain the relative movement between the upper leg tube and the lower leg tube. The gross adjustment of the stability leg can lock the upper leg tube in an upper position for installing the infant car seat in a shorter and center vehicle seat, and further lock the upper leg tube in a lower position for installing the infant car seat in a taller and outboard vehicle seat; the fine adjustment of the stability leg can lock the lower leg tube via one of the holes on the lower leg tube to change an extended length of the stability leg.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A seat base configured to removably couple to an infant car seat, the seat base comprising a release actuator positionable to engage a stability leg with a seat base of an infant car seat, the release actuator comprising:
    a locking portion adapted to releasably engage with a free end of the stability leg of the infant car seat in a storage mode; and
    a handle portion connected to the locking portion and movably disposed on the seat base, the locking portion being disengageable from the stability leg via an external force applied to the handle portion.

2. The seat base of claim 1, wherein the release actuator further comprises a connection portion disposed between the handle portion and the locking portion, two ends of the connection portion are respectively assembled with the handle portion and the locking portion in a movable manner.

3. The seat base of claim 2, wherein the release actuator further compromises a first resilient component disposed between the handle portion and the seat base, and further comprises a second resilient component disposed between the locking portion and the seat base.

4. The seat base of claim 3, wherein the seat base comprises a reclined foot, the release actuator is movably disposed inside the reclined foot, the locking portion is engaged with the stability leg via deformation of the first resilient component when the handle portion is moved with rotation of the reclined foot.

5. The seat base of claim 1, wherein the locking portion has a sunken structure adapted to be applied by an external force for disengaging the locking portion from the stability leg.

6. The seat base of claim 1, wherein the free end of the stability leg is a locking end including a locking slot.

7. The seat base of claim 1, wherein the free end includes a foot surface positionable to contact a supporting surface proximate the infant car seat.

8. The seat base of claim 7, wherein the foot surface of the stability leg includes a locking slot.

9. The seat base of claim 7, wherein the foot surface of the stability leg is rotatable into an exposed position when disengaged from the locking portion.

10. A seat base configured to removably couple to an infant car seat, the seat base comprising a release actuator positionable to engage a stability leg with a seat base of an infant car seat, the release actuator comprising:
    a locking portion adapted to releasably engage with a free end of the stability leg; and
    a handle portion connected to the locking portion and movably disposed on the seat base, the locking portion being disengageable from the stability leg via an external force applied to the handle portion;
    wherein the free end of the stability leg is a locking end including a locking slot.

11. A seat base configured to removably couple to an infant car seat, the seat base comprising a release actuator positionable to engage a stability leg with a seat base of an infant car seat, the release actuator comprising:
    a locking portion adapted to releasably engage with a free end of the stability leg; and
    a handle portion connected to the locking portion and movably disposed on the seat base, the locking portion being disengageable from the stability leg via an external force applied to the handle portion;
    wherein the free end of the stability leg includes a foot surface positionable to contact a supporting surface proximate the infant car seat, the foot surface including a locking slot.

* * * * *